May 6, 1947.                    C. SMITH                    2,420,206
PRESSURE AND TEMPERATURE RELIEF VALVE
Filed Oct. 7, 1944
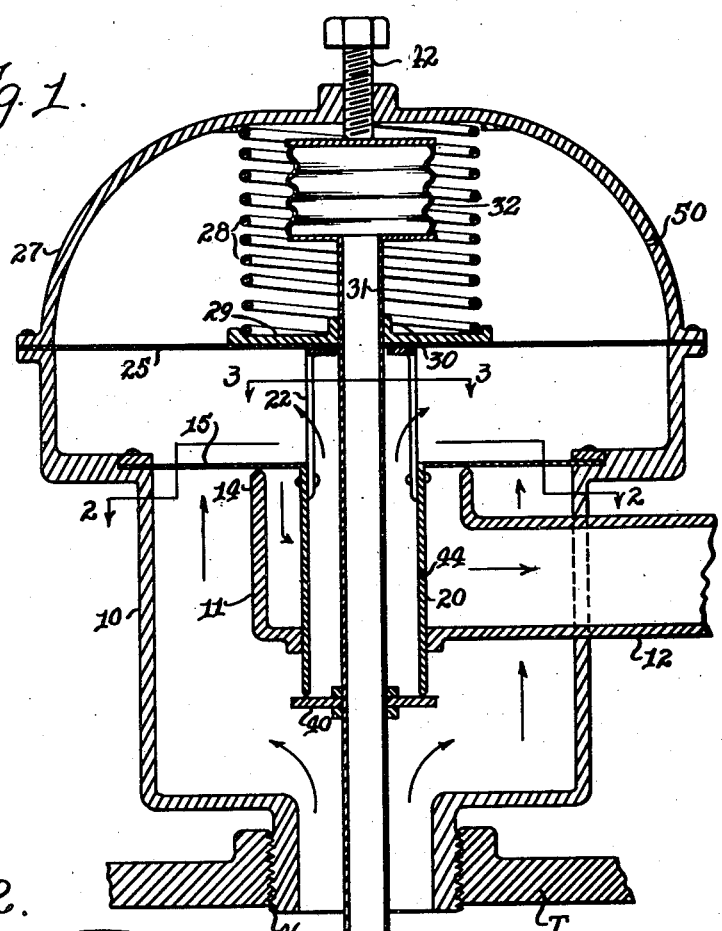
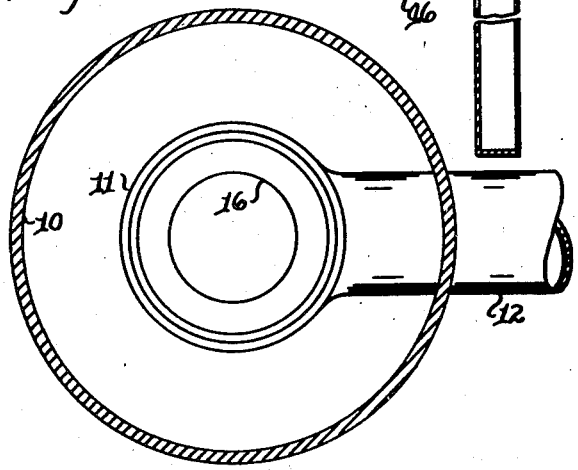
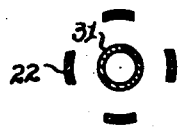
INVENTOR.
Chetwood Smith.
BY Chas. T. Hawley
Atty.

Patented May 6, 1947

2,420,206

UNITED STATES PATENT OFFICE 2,420,206

PRESSURE AND TEMPERATURE RELIEF VALVE

Chetwood Smith, Worcester, Mass.

Application October 7, 1944, Serial No. 557,644

3 Claims. (Cl. 236—80)

This invention relates to a relief valve designed to protect a hot water tank or other similar container from both excessive pressure and excessive temperature.

It is the general object of my invention to provide a pressure and temperature relief valve which is of improved and simplified construction and which is reliable and effective in operation.

To the attainment of this general object, I provide a relief valve having a main valve directly responsive to excessive pressure and having a pilot valve which opens for excessive temperature and which thereupon causes the main valve to be opened by tank pressure. I also provide a relief valve in which the main valve opens with and not against the pressure.

My invention further relates to arrangements and combinations of parts which will be hereinafter described and more particularly pointed out in the appended claims.

A preferred form of the invention is shown in the drawings, in which

Fig. 1 is a sectional front elevation of my improved valve;

Fig. 2 is a plan view of the valve body, partly in section, taken along the irregular line 2—2 in Fig. 1; and Fig. 3 is a detail sectional view, taken along the line 3—3 of Fig. 1.

Referring to the drawings, my improved valve comprises a body or casing 10 having an exhaust member 11 integral therewith and provided with an exhaust or waste pipe 12. The member 11 has an annular knife edge seat 14 at its upper edge, which seat is engaged by a diaphragm 15 which is secured in the upper portion of the body or casing 10.

The exhaust member 11 also has a central opening 16 (Fig. 2) in which a tube 20 is a close sliding fit. The upper end of the tube 20 is welded or otherwise secured to the middle portion of the diaphragm 15 and is also connected by spaced supporting members 22 (Fig. 3) with an upper diaphragm 25.

The diaphragm 25 is mounted between the upper end of the body or casing 10 and the lower edge of a cap 27 forming an upper casing or cover for the relief valve. A relatively heavy coil spring 28 is mounted in the cap 27 and its lower end engages a plate 29 which is secured to the middle portion of the diaphragm 25. At its center, the plate 29 has a bearing portion 30 which slidably supports a relatively small tube 31, which is connected at its upper end to a bellows operator 32 of usual commercial type.

The tube 31 extends downward into the hot water tank or other container T, and both the tube 31 and the bellows operator 32 are filled with a temperature-responsive liquid which expands with considerable rapidity in response to an increase in temperature. The tube 31 has a disc valve 40 fixed thereon and positioned to engage an annular knife edge seat at the lower end of the tube 20 previously described.

A set-screw 42 may be provided in the cap 27 for adjusting the bellows member 32, and a bleed opening 44 connects the inside of the tube 20 with the waste pipe 12. The lower end of the body or casing 10 has a threaded portion 46 adapted to be secured in the top of the hot water tank T.

Having described the details of construction of my improved relief valve, the operation thereof is as follows:

Under normal conditions, hot water under pressure flows up through the threaded connection 46 into the body 10 and presses against the under side of the diaphragm 15. This diaphragm, however, is firmly held downward against its annular seat 14 on the exhaust member 11 by the relatively heavy spring 28, acting through the plate 29, supports 22 and tube 20 secured to the diaphragm 15. The tube 31 and bellows operator 32 are normally contracted sufficiently so that the pilot valve 40 will be firmly seated against the lower end of the tube 20 by the tank pressure.

If the water pressure increases in the tank T, the pressure against the under side of the diaphragm 15 correspondingly increases until this pressure, communicated through the supports 22, is sufficient to overcome the spring 28. The diaphragm 15 is then forced upward, allowing water to escape over the upper edge or seat 14 of the exhaust member 11 and out of the waste pipe 12. As the excessive pressure is relieved, the diaphragm 15 will be again seated by the spring 28.

The bleed opening 44 ordinarily relieves any hydraulic pressure which might accumulate by leakage above the diaphragm 15 and normally maintains atmospheric pressure between the diaphragms 15 and 25. The cap or cover 27 has an atmospheric vent 50.

In the event of an excessive rise in temperature, the liquid in the tube 31 and bellows operator 32 expands, pushing the tube 31 downward through its bearing 30 and forcing the pilot valve 40 away from its seat at the lower end of the tube 20. Water then flows from the tank T and body 10 upward through the tube 20 and into the space between the diaphragms 15 and 25. This water pressure, applied to the relatively large lifting area of the diaphragm 25, overcomes the spring 28 and also overcomes the pressure on the much smaller annular area of the diaphragm 15 between the seat 14 and the tube 20. The diaphragm 25 then moves upward and lifts the diaphragm 15 from its seat on the exhaust member 11, by reason of its connection thereto through the supports 22. The overheated water will then flow from the body 10 over the upper edge of the exhaust member 11 to the waste pipe 12 and such flow will continue until the replacement of hot water by cold feed water has overcome the excessive temperature. The pilot valve 40 then closes and the relief valve is thus restored to initial and normal operating condition.

Having thus described my invention and the advantages thereof, I do not wish to be limited to the details herein disclosed, otherwise than as set forth in the claims, but what I claim is:

1. In a pressure and temperature relief valve having a casing and a waste connection thereto, in combination, a smaller main valve diaphragm normally directly closing said waste connection, a larger diaphragm connected to move said smaller main valve diaphragm and open said waste connection, a normally atmospheric chamber between said diaphragms, and a temperature-responsive pilot valve admitting water under pressure to said chamber between said diaphragms on the occurrence of excessive temperature, said water under pressure acting against said larger diaphragm to unseat and lift said smaller main valve diaphragm.

2. A pressure and temperature relief valve comprising a casing, a waste connection thereto, a diaphragm mounted in said casing and normally closing said waste connection, a second diaphragm mounted in said casing in spaced relation to said first diaphragm but connected thereto and having a greater effective area, a spring effective to press said two diaphragms downward and to normally seat said first diaphragm on said waste connection, and a temperature-responsive pilot valve effective on excessive rise in temperature to admit water under pressure between said diaphragms, thereby overcoming said spring and lifting both diaphragms and opening said waste connection.

3. A pressure and temperature relief valve comprising a casing, a waste connection thereto, a diaphragm mounted in said casing and normally closing said waste connection, a second diaphragm mounted in said casing in spaced relation above said first diaphragm, said two diaphragms defining a normally atmospheric chamber, a structural connection between said diaphragms, a spring to press said upper diaphragm downward and effective through said structural connection to normally seat said first diaphragm on said waste connection, and a temperature-responsive pilot valve effective on excessive rise in temperature to admit water under pressure to the chamber between said diaphragms, overcoming said spring and lifting both diaphragms and thereby opening said waste connection.

CHETWOOD SMITH.

REFERENCES CITED

The following references are of record in the file of this patent:

UNITED STATES PATENTS

| Number | Name | Date |
| --- | --- | --- |
| 1,574,075 | Fischer | Feb. 23, 1926 |
| 2,035,512 | Smith | Mar. 31, 1936 |
| 2,223,115 | McDermott | Nov. 26, 1940 |
| 1,229,726 | Ebeling | June 12, 1917 |
| 2,305,848 | Dobler | Dec. 22, 1942 |
| 2,099,643 | Werring | Nov. 16, 1937 |
| 2,389,437 | Kmiecik | Nov. 20, 1945 |

OTHER REFERENCES

Halsey, pages 315 and 316 of "Handbook for Machine Designers," by F. A. Halsey, 2nd ed., published 1916 by McGraw-Hill Publishing Co., New York city.